Oct. 5, 1943.  W. H. GILLE ET AL  2,331,183
CONTROL APPARATUS
Filed April 13, 1942
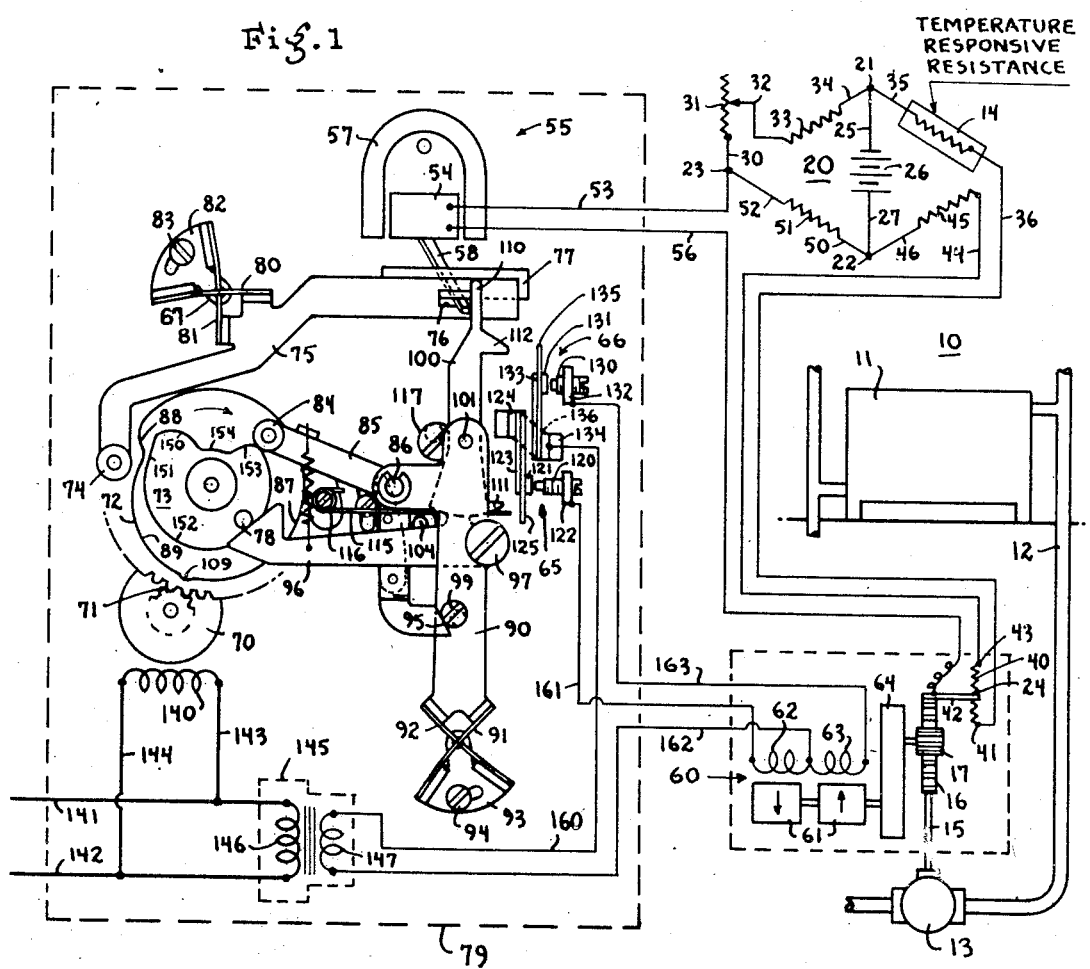
Willis H. Gille
John V. Sigford
Leslie H. Miller
INVENTORS
BY George H. Fisher
Attorney Patented Oct. 5, 1943

2,331,183

UNITED STATES PATENT OFFICE 2,331,183

CONTROL APPARATUS

Willis H. Gille, St. Paul, and John V. Sigford and Leslie H. Miller, Minneapolis, Minn., assignors to Minneapolis-Honeywell Regulator Company, Minneapolis, Minn., a corporation of Delaware Application April 13, 1942, Serial No. 438,800

15 Claims. (Cl. 236—70)

The present invention relates to sensitive relay mechanisms, and particularly to sensitive relay mechanisms which perform a control function in accordance with the position of a galvanometer needle or other sensitive measuring element.

An object of the present invention is to provide an improved mechanical relay mechanism of the type disclosed in the co-pending application of Willis H. Gille, Serial No. 409,523, filed September 4, 1941.

A further object of the invention is to provide a sensitive relay mechanism in which the dimensions of the parts are not critical, and in which accurate machining of the parts is therefore unnecessary.

A further object of the invention is to provide, in a sensitive relay mechanism including a cam and a follower member to be accurately positioned thereby, a motion reducing linkage between the cam and its ultimate follower, so that the manufacturing tolerances for the cam may be greater than the allowable error in the position of the ultimate follower.

A further object of the present invention is to construct a sensitive relay mechanism wherein a control member is positioned periodically by being moved into engagement with a clamped galvanometer needle, and wherein the control member is unbiased. A still further object is to construct such a mechanism including slip friction means associated with the control member for preventing the transmission of distorting forces to the galvanometer needle.

Other objects and advantages of my invention will become apparent after a consideration of the accompanying specification, claims, and drawing, in which:

Figure 1 illustrates, somewhat diagrammatically, a control system embodying my invention, Figure 2 is a view looking from the rear of an operating assembly constituting an essential part of the mechanism shown in Figure 1, and Figure 3 illustrates a detail of the mechanism shown in Figure 1.

Figure 1 shows a system for controlling the temperature of a space 10. A radiator 11 is provided to heat the space 10, and steam or other heating fluid is delivered to the radiator 11 through a supply pipe 12. A valve 13 connected in the pipe 12 controls the supply of heating fluid to the radiator 11. A resistance element 14, of nickel or some other suitable substance having an appreciable temperature coefficient of resistance, is mounted in the space 10. The resistance element 14 and the valve 13 are interconnected by the control system in such a manner that the position of the valve 13 is determined by the resistance of the element 14.

The valve 13 is positioned by means of a stem 15 rigidly connected to a rack 16 which cooperates with a motor driven pinion 17.

The temperature responsive resistance element 14 is connected to a bridge circuit generally indicated at 20, having input terminals 21 and 22 and output terminals 23 and 24. The input circuit of the bridge 20 connects terminals 21 and 22 and comprises a conductor 25, a battery or other suitable source of electrical energy 26, and a conductor 27.

The upper left-hand arm of the bridge 20, as it appears in the drawing, connects output terminal 23 with input terminal 21 and includes a conductor 30, a variable resistance 31, a conductor 32, a fixed resistance 33 and a conductor 34. Variable resistance 31 serves to adjust the value of temperature in space 10 at which bridge 20 is balanced, for a given position of valve 13.

The upper right-hand arm of the bridge circuit 20 connects input terminal 21 with output terminal 24 and includes a conductor 35, temperature responsive resistance element 14, a conductor 36, and that portion of a slidewire resistance 40 between a terminal 41 and the point of engagement of a slider 42 with the slidewire 40. The output terminal 24 is the point of engagement referred to. The slider 42 is rigidly attached to the stem 15 of the valve 13, and its position along the slidewire 40 serves as a measure of the valve position.

The lower right hand arm of the bridge circuit 20 connects output terminal 24 with input terminal 22, and includes that portion of slidewire resistance 40 between output terminal 24 and a terminal 43, a conductor 44, a fixed resistance 45, and a conductor 46.

The lower left-hand arm of the bridge circuit 20, as it appears in the drawings, connects input terminal 22 with output terminal 23, and includes a conductor 50, a fixed resistance 51, and a conductor 52.

The output circuit of bridge 20 connects output terminals 23 and 24, and includes a conductor 53, the moving coil 54 of a galvanometer generally indicated at 55, a conductor 56, and the slider 42. The galvanometer 55 includes a permanent magnet 57 between whose poles the coil 54 is rotatably mounted and a pointer 58 carried by the coil 54.

The pinion 17 is driven by a motor, generally indicated at 60, having a rotor structure 61 and a pair of opposed field windings 62 and 63. The rotor structure 61 is connected to the pinion 17 through a motion reducing gear train generally indicated at 64. As indicated by the legend in the drawing, energization of motor field winding 62 causes rotation of rotor 61 in a direction opposite to that caused by energization of field winding 63. A pair of switches 65 and 66 control the energization of windings 62 and 63. A sensitive relay mechanism is employed to control the operation of switches 65 and 66 in accordance with the position of the galvanometer pointer 58.

A continuously rotating motor 70 drives, through a gear train schematically indicated at 71, a pair of rotary cams 72 and 73. Cam 72 cooperates with a follower 74 mounted on one end of a pivoted lever 75 so as to operate the lever 75 and periodically clamp the galvanometer needle 58. Lever 75 is provided with an aperture 76 through which the pointer 58 passes. The aperture 76 is elongated to allow movement of the galvanometer pointer 58 in response to unbalance of the bridge circuit 20. Above the part of the pointer 58 which passes through the aperture 76 is mounted a bar 77.

The whole sensitive relay mechanism is supported on a suitable plate, diagrammatically indicated at 79. Lever 75 is supported by a pair of flat springs 80 and 81 attached to upstruck lugs on the lever 75. The other end of the flat springs 80 and 81 are attached to similar lugs on a bracket 82 adjustably mounted by means of a screw and slot connection 83 on supporting plate 79. The springs 80 and 81 are so shaped that the center portion of spring 80 lies in front of and is spaced slightly from the center position of spring 81.

The assembly consisting of bracket 82, springs 80 and 81, and lever 75 is constructed with the springs unstressed, so that they take up a position where their planes are mutually perpendicular, intersecting in a line perpendicular to the plane of the drawing and passing through a point 67 on the bracket 82. This assembly is then mounted on the plate 79 by means of the screw and slot connection 83 in such a manner that the springs are forced out of their normal flat condition, and stressed just sufficiently to bias the lever 75 to provide the desired clamping pressure on the pointer 58 when follower 74 is adjacent the low point of cam 72.

This crossed spring pivot has no lost motion to be taken up when the lever 75 clamps the pointer 58, such as is characteristic of more conventional pivot structures. In a common pivot of the type where a shaft passes through a bearing, the shaft must be of smaller diameter than the hole in the bearing in order to permit freedom of movement. The shaft therefore moves at least slightly eccentrically with respect to the bearing, and when a load is added to the shaft or bearing which acts as an angle to the previously existing load, a shift takes place in the point of contact of shaft and bearing. In a device of the type under consideration, this shift in the bearing point would take place at the moment the pointer was clamped. Such a shift might permit slipping of the pointer after the initial engagement, with a resultant inaccuracy in the operation of the device. While this difficulty can be largely overcome by careful dimensioning of the shaft and bearing, it should be remembered that one of the objects of this invention is to obviate the necessity for such careful dimensioning.

The crossed spring pivot mechanism, which is well known in the art, is also entirely frictionless. The force needed to rotate the lever may be determined from the characteristics of the springs 80 and 81, and is not subject to change because of friction at the pivot point.

As the cam 72 rotates, it engages the follower 74 and reciprocates the lever 75 so that the aperture 76 is moved transversely to the path of the galvanometer pointer 58. As the right-hand end of lever 75 approaches the upper limit of its reciprocating movement, the pointer 58 is clamped between the lower edge of aperture 76 and the lower edge of the bar 77. With the parts in the position shown in the drawing, the galvanometer pointer 58 has just been clamped in that manner. When so clamped, the pointer 58 prevents further upward movement of the right-hand end of lever 75, so that the follower 74 rides free of the cam 72, as shown in the drawing.

Cam 73 which rotates as a unit with cam 72, cooperates with a follower 84 mounted on one end of a bell-crank lever 85, which is pivotally mounted as at 86 on a lever 90. Lever 90 is supported by a pair of flat springs 91 and 92 attached to lugs on its lower end. The other ends of the flat springs 91 and 92 are attached to similar lugs on a bracket 93 attached to a support 79 through an adjustable screw and slot connection 94. The flat spring members 91 and 92 not only support the lever 90, but bias it so that the follower 84 is held in engagement with the cam 73, the arrangement being generally similar to the pivotal support of lever 75 by the flat springs 80 and 81.

Bell-crank lever 85 forms part of a motion reducing mechanism connecting cam 73 with lever 90. The lower end 95 of the bell-crank lever 85 engages an adjustable stop 99 comprising a screw threadedly mounted on the lever 90, and having an eccentric head. A brake lever 96 is pivotally supported on the lever 90, as at 97, and is provided with a shoe portion 98 adapted for engagement with a suitable surface on a switch operator 100. The switch operator 100 is also pivotally mounted on the lever 90 by a pin 101. A tension spring 102 connects bell-crank lever 85 and brake lever 96. The spring 102 has two functions. The first is to bias the bell-crank lever 85 into engagement with the stop 99. The second is to bias brake lever 96 so that the shoe portion 98 engages the switch operator 100.

From the foregoing description, it may be seen that the lever 90 supports and reciprocates an operating assembly whose chief elements are the operator 100, the bell-crank lever 85, and the brake lever 96. Figure 2 shows a back view of this operating assembly, which may be compared with the front view appearing in Figure 1. In Figure 2, it may be seen that a shoe piece 108 is riveted or otherwise suitably fastened to the back of the bell-crank lever 85. The shoe piece 108 has an arcuate surface 103. The surface 103 of the shoe piece 108 is adapted to engage a stop 104 mounted on a plate 105. The plate 105 is pivotally attached to the supporting plate 79 at 106 and is adjustable with respect to the plate 79 by means of a screw and slot connection 107. The curvature of the surface 103 is the same as that of the arc in which the stop 104 moves as the plate 105 is rotated about its pivot point 106. The function of the adjustable stop 104 in cooperation with the shoe piece 102 is to change the ratio by which the motion imparted to follower 84 by cam 73 is reduced during transmission to the lever 90. The exact mode of operation of these elements will be described in detail in connection with the description of the operation of the device as a whole.

Switch operator 100 carries at its upper end a long vertical extension 110 which is adapted to engage galvanometer pointer 58. Switch operator 100 is also provided, along its right-hand edge as it appears in Figure 1, with a pair of lateral projections 111 and 112, which are adapted to engage and operate the switch members 65 and 66, respectively. The lower end of operator 100 is provided with an arcuate surface 113, whose center of curvature is the point 101 at which the operator 100 is pivoted. This surface 113 is adapted for engagement by the brake shoe 98. The surface 113 is provided with a groove 114 which is arcuate about center 101 and an elongated spring member 115, attached to the plate 79, as at 116, and is adapted to frictionally engage and ride in the groove 114.

The pin 101 extends rearwardly from the operator 100. An adjustable stop 117, comprising a screw having an eccentric head, threadedly engages the plate 79 so as to lie in the path of movement of the rearward extension of pin 101.

A pin 78 is mounted on the cam 73 and serves to periodically engage the extremity of brake lever 96 and rotate it about its pivot 97 so as to disengage the brake shoe 98 from the brake surface 113 on the operator 100.

Switch 65 comprises a stationary contact 120 and a movable contact 121. Stationary contact 120 threadedly engages a bracket 122 attached to the plate 79. Movable contact 121 is supported at the end of a leaf spring 123 whose opposite end is attached to a bracket 124 also supported on the plate 79. The leaf spring 123 is self-biased so as to cause engagement of contact 121 with stationary contact 120. A second elongated spring member 125 is also attached to the bracket 124. The spring member 125 is biased in opposition to the spring 123 and is provided with a hole midway of its length so that the movable contact 121 can pass through it into engagement with contact 120. The relative initial tensions of springs 123 and 125 are such that they tend to take a neutral position wherein contacts 120 and 121 are separated. The spring 125 is longer than the spring 123 and that portion of the spring 125 which extends beyond contact 121 lies in the path of movement of projection 111 on the right-hand edge of switch operator 100. As projection 111 moves to the right in Figure 1, it engages the extremity of leaf spring 125 and carries it to the right away from leaf spring 123. Leaf spring 123, being biased for movement to the right, follows the spring 125 until contact 121 engages stationary contact 120. After engagement of contacts 120 and 121 takes place, leaf spring 125 may continue to move to the right under the influence of projection 111. It should be readily apparent, however, that this movement of leaf spring 125 will not change the contact pressure between contacts 120 and 121. The leaf spring 125 therefore serves as a strain release between operator 100 and movable switch contact 121.

Switch 66 is similar in construction to switch 65. It consists of a stationary contact 130 and a movable contact 131. Contact 130 is threadedly mounted through a bracket 132 attached to plate 79. Contact 131 is mounted on a leaf spring 133 attached to a second bracket 134. A strain release leaf spring 135 cooperates with leaf spring 133 and projection 112 of operator 100 in the same manner that strain release leaf spring 125 cooperates with leaf spring 123 and projection 111 in switch 65. The brackets 124 and 134 are connected on the back of the plate 79 by a suitable conductor strip 136 shown in dotted lines in the drawing.

Motor 70 is provided with a winding 140 directly connected to power supply lines 141 and 142 by means of conductors 143 and 144, respectively. A transformer 145 is provided having a primary winding 146 connected to power supply lines 141 and 142, and a secondary winding 147, which supplies power to the motor 60 through circuits to be hereinafter described in detail.

*Operation*

With the parts in the positions shown in the drawing, the bridge circuit 20 is balanced. There is therefore no current flowing in the bridge output circuit and the galvanometer pointer 58 is positioned in the center of its range of travel. The valve 13 is approximately half-way open, and the slider 42 is therefore approximately midway between the terminals of the slidewire 40.

Cam 72 has a portion 87 of constant radius followed by a drop-off portion 88, a slow rise portion 89 and a small hump 109. Cam 72 rotates clockwise as indicated by the legend in the drawing. When the parts are in the position shown in the drawing, the follower 74 has just moved down the drop-off portion 88, allowing the bias of flat spring members 80 and 81 to swing the lever 75 in a counter-clockwise direction, thereby clamping galvanometer pointer 58 between the lower edge of aperture 76 and the lower edge of bar 77.

As the cam 72 continues to rotate clockwise, the slow rise portion 89 engages follower 74, causing counter-clockwise movement of lever 75 and carrying the lower edge of aperture 76 away from the galvanometer pointer 58. As the follower 74 moves over the hump 109, the upper edge of aperture 76 comes down and engages the upper side of galvanometer pointer 58, thereby dislodging it from the edge of bar 77 in case it has become stuck there. Follower 74 immediately moves back to the constant radius portion 87, so that the upper edge of aperture 76 is retracted behind the bar 77, freeing the pointer 58. The pointer remains free to move within the aperture 76 as long as the follower 74 rides on the dwell portion 87. When the follower 74 again moves down the drop-off portion 88, lever 75 is again moved counter-clockwise, clamping the pointer 58 as previously described.

Cam 73 comprises a rise portion 150 followed by a rapid drop-off portion 151, a slow drop-off portion 152, a very rapid drop-off portion 153, and a low dwell portion 154. Cam 73 moves the follower 84 in accordance with the variations of its contour. As previously noted, the bell-crank lever 85 carrying the follower 84 is biased by spring 102 so that its lower end 95 engages a stop 99 on the lever 90. As long as the lower end 95 of bell-crank lever 85 remains in engagement with stop 99, the levers 85 and 90 are reciprocated as a unit about the pivot formed by springs 91 and 92. As lever 85 moves to the right under the influence of cam 73, the surface 103 of shoe piece 102 attached to the back of lever 85 engages the stop member 104. After this engagement takes place, further movement of the lever 85 by the cam 73 causes it to rotate about the pivot point 86, separating the lower end 95 of lever 85 from the stop 99. The motion of follower 84 caused by cam 73 thereafter takes place partially about the pivot point 86, and only a part of the movement is transmitted to the lever 90.

The amount of reduction between the motion of follower 84 and the motion of lever 90 is governed by the adjustment of stop 104 by the screw and slot connection 107. The ratio of the movement of lever 90 to that of follower 84 is determined by the ratio of the distance between stop 104 and the pivot point 86 to the distance between stop 104 and follower 84. It may readily be seen that as stop 104 approaches the position of pivot point 86, this ratio becomes smaller, and therefore the reduction of movement between follower 84 and lever 90 becomes greater.

The essential function of the assembly supported by the lever 90 is to alternately position the operator 100 in accordance with the position of the clamped galvanometer pointer 58 and then to move the positioned operator 100 to the right into engagement with one or the other of switch contacts 55 and 56. The cam 73 is so proportioned that this engagement of switch 65 or 66 takes place for a period of time proportional to the deflection of the pointer 58 from its center position.

With the parts in the position shown in the drawing, follower 84 is just about to move down the rapid drop-off portion 153 of cam 73, thereby allowing lever 90 to move rapidly to the left under the influence of springs 91 and 92. Just before the follower 84 moves down the drop-off portion 153, the pin 78 engages the end of brake lever 96 and rotates it counter-clockwise about the pivot 97. This separates brake shoe 98 from the braking surface 113 on operator 100. The operator 100 is then free to move about its pivot 101 restrained only by the friction between spring 115 and groove 114. As the lever 90 moves rapidly to the left, the pivot 101 is moved with it. The lower end of operator 100 is restrained however by friction between the spring 115 and groove 114. Operator 100 therefore rolls along spring 116, rotating in a counter-clockwise direction about the pivot 101. The long vertical extension 110 of operator 100 therefore moves to the left at a rate faster than the leftward movement of lever 90. This rapid leftward movement of extension 110 continues until it engages the clamped galvanometer pointer 58. Further movement of lever 90 to the left causes operator 100 to rotate clockwise about the pivot 101, and the spring 115 slips along the groove 114 to permit this motion.

The position of adjustable stop 117 determines the limit of movement of lever 90 to the left. After the pin 101 engages stop 117, follower 84 rides free of the cam 73. The effect of this is to make the final position of operator 100 dependent on pointer 58 and stop 117, rather than on pointer 58 and low portion 154 of cam 73. We have found that the position of stop 117 can be determined with less error than the position of the low dwell portion 73. The stop 117 is used therefore to make the device more accurate and less subject to errors of manufacture.

After the operator 100 is established at a position relative to the lever 90 which is determined by the position of the clamped galvanometer pointer 58, pin 78 moves out of engagement with brake lever 96. The brake lever 96 moves back to its normal position under the influence of tension spring 102, thereby engaging brake shoe 98 with the braking surface 113 of operator 100 and locking it in the position which has been determined by the clamped pointer 58. When the operator 100 is moved by lever 90 while it is locked by brake shoe 98, the spring 115 slides freely in the groove 114.

As the follower 84 moves up the riser portion 150 of cam 73, lever 90 is moved rapidly to the right until the stop 104 engages the surface 103 attached to bell-crank lever 85. After this engagement takes place, the movement of lever 90 to the right continues but at a slower rate than the rate of rise of cam 73, as previously explained. Since the galvanometer pointer 78 is clamped in its neutral position, the operator 100 is also set in a neutral position, and at the extreme limit of the movement to the right, both the projections 111 and 112 engage the respective fingers 125 and 135, but do not move either one sufficiently to operate the switches 65 and 66. As cam 73 continues to rotate, the lever 90 moves back to the left and the whole cycle of operation previously described is repeated.

It may now be seen that the purpose of the adjustable stop 99 is to determine the point in the travel of lever 90 at which the motion reducing mechanism becomes effective. Adjustment of stop 99 changes the normal angular position of bell-crank lever 85 with respect to lever 90. By normal position is meant that position of lever 85 wherein its lower end 95 engages stop 99. This normal angular position of lever 85 determines the spacing between surface 103 and stop 104 when the lever 90 is in its extreme left position. This spacing determines the distance through which lever 90 moves to the right before the motion reducing mechanism begins to function.

Now let it be assumed that the temperature in the space 10 decreases below the value which the system has been set to maintain by adjustment of variable resistance 31. This decrease in temperature causes a decrease in the resistance of the temperature responsive element 14, thereby causing an unbalance of the bridge circuit, in a manner well known in the art, so that a current flows in the bridge output circuit in a direction from output terminal 24 to output terminal 23. This current flowing in the coil of galvanometer 55 causes a deflection of pointer 58 to the left as viewed in the drawing. For the sake of illustration, let it be assumed that the pointer 58 takes up a position at the extreme left end of the aperure 76 and is clamped in that position by the lever 75. Then when the operator 100 is positioned by engagement of projection 110 with pointer 58, it takes up a position which is displaced counter-clockwise from the position shown in the drawing. It is clamped in this position by the brake 96, and when the lever 90 moves again to the right, the projection 111 engages strain release spring 125 and causes engagement between contacts 120 and 121. This completes an energizing circuit for winding 62 of motor 60. This circuit may be traced from the upper terminal of transformer secondary winding 147 through a conductor 160, bracket 134, conductor 136, bracket 124, leaf spring 123, contacts 121 and 120, bracket 122, a conductor 161, motor winding 62, and a conductor 162 to the lower terminal of transformer secondary winding 147. Energization of winding 62 causes rotation of motor 16 in such a direction as to drive the valve 13 toward open position and move the slider 42 upwards along the slidewire 40. This movement of slider 42 increases the portion of resistor 40 connected in series with the temperature responsive element 14, and thereby tends to restore the resistance in that arm of the bridge to its normal value. At the same time, the resistance in the adjacent arm of the bridge is reduced. Both of these effects tend to restore the bridge circuit to a condition of balance.

Energization of motor winding 62 continues periodically in accordance with the reciprocation of lever 90 and the position of galvanometer pointer 58. As soon as the bridge has been rebalanced, the pointer 58 again moves to its center position, and on the next cycle of operation, the operator 100 operates neither of the switches 65 nor 66. The net result of the operation of the system just described is to open the valve 13 somewhat so that more steam is supplied to the radiator 11 to bring the temperature of the space 10 back to the value which it is desired to maintain.

Now let it be assumed that the temperature in the space 10 increases above the value which the system has been set to maintain. This causes unbalance of the bridge circuit 20 in the opposite direction, and current flows from output terminal 23 to the output terminal 24 through the coil 54 of galvanometer 55. This causes a deflection of pointer 58 to the right from its normal position, and therefore when the operator 100 is next set by the pointer 58, it takes up a position displaced clockwise with respect to lever 90 from a position shown in the drawing. When the operator 100 is moved to the right, it engages switch 66, thereby completing an energizing circuit for winding 63 of motor 60. This energizing circuit may be traced from the upper terminal of secondary winding 147 through conductor 160, bracket 134, leaf spring 133, contacts 130 and 131, bracket 132, conductor 163, motor winding 63, and conductor 162 to the lower terminal of transformer secondary winding 147. Energization of winding 63 causes operation of motor 60 in such a direction as to close the valve 13 and move slider 42 downward along the slidewire 40. This motion continues periodically under control of the sensitive relay mechanism until the bridge circuit 20 is rebalanced through the motion of the slider 42 along the slidewire 40. At this time the valve 13 will have been closed slightly so as to reduce this supply of heat to the radiator 11 and allow the temperature of the space 10 to decrease to the desired value.

It should be noted that the cam 73 moves the lever 90 rapidly to the right, and then slowly backward to the left. In this way, the time at which the projections 111 and 112 engage the switches 65 or 66 is determined solely by the contour of the cam 73. As the lever 90 moves slowly backward to the left, however, the time at which the projection 111 or 112 separates from its associated switch is determined by the position of the operator 100 with respect to the lever 90. Therefore, it will be seen that the length of time during which the motor winding 62 or 63 is energized is determined by the amount which the galvanometer pointer 58 is deflected from its normal position.

If cam 73 were shaped so as to have a smooth drop between the high point of rise 150 and the beginning of the steep drop-off 153, a constant ratio would be maintained between galvanometer deflection and the length of the period of motor energization. It has been found desirable, however, in order to overcome the tendency of the control system to overshoot the balance point of the bridge circuit, to reduce the period of motor energization in proportion to galvanometer deflection when the deflection is small. This effect is achieved by shaping the cam 73 so that it has a first rapid drop-off portion 151 followed by a long relatively slow drop-off portion 152, instead of having a smooth drop between the high point of rise 150 and the beginning of the steep drop-off 153. The operation of this type of cam in preventing over-shooting is explained in detail in the co-pending application of Willis H. Gille, Serial No. 409,523, previously referred to.

It is necessary, in a control system of this type, that the period of motor energization be accurately controlled. It will be apparent that the position of the lever 90 must be accurately determined at all times in order to control the energization period. To secure this desired result, accurate cutting of the cam 73 is necessary. By inserting the motion reducing mechanism between cam 73 and lever 90, we have made it possible to exaggerate the contour of the cam, so that inaccuracies due to errors in the cam form have substantially no effect on the motion of the lever 90.

While we have disclosed a specific embodiment of our invention, other modifications will readily occur to those skilled in the art, and it should therefore be understood that the invention is limited only by the scope of the appended claims.

We claim as our invention:

1. In a sensitive relay mechanism, in combination, a member for performing a control function, an operator for engaging said member so as to cause it to perform said control function, means for positioning said operator in accordance with a controlling condition, means for reciprocating said operator between said positioning means and said control member, said reciprocating means comprising a cam and a follower therefor, said cam being proportioned so that the period of engagement between said operator and said member is a function of the operator position, and a motion reducing linkage between said follower and said operator.

2. In a sensitive relay mechanism, in combination, a member for performing a control function, an operator for engaging said member so as to cause it to perform said control function, means for positioning said operator in accordance with a controlling condition, means for reciprocating said operator between said positioning means and said control member so that the period of engagement between said operator and said member is a function of the operator position, said reciprocating means including a lever and a pivotal connection for supporting said operator on said lever, a stationary frame for supporting said lever, and a slip-friction connection between said frame and said operator for causing rotation of said operator about said pivotal connection during reciprocation of said lever.

3. In a sensitive relay mechanism, in combination, a member for performing a control function, an operator for engaging said member so as to cause it to perform said control function, means for positioning said operator in accordance with a controlling condition, means for reciprocating said operator between said positioning means and said control member, so that the period of engagement between said operator and said member is a function of the operator position, said reciprocating means including a lever and a pivotal connection for supporting said operator on said lever, a stationary frame for supporting said lever, a slip-friction connection between said frame and said operator for causing rotation of said operator about said pivotal connection during reciprocation of said lever, brake means for preventing rotation of said operator about said pivotal connection, and means for applying said brake means after said operator has been positioned by said positioning means and releasing said brake means after the termination of said period of engagement between said operator and said member.

4. In a sensitive relay mechanism, in combination, a member for performing a control function, an operator for engaging said member so as to cause it to perform said control function, means for positioning said operator in accordance with a controlling condition, means for reciprocating said operator between said positioning means and said control member, said reciprocating means comprising a pivoted lever for supporting said operator and cam means for moving said supporting lever, a bell-crank lever pivotally mounted on said supporting lever, first stop means mounted on said supporting lever for cooperation with one end of said bell-crank lever to limit its rotation about said pivotal mounting, follower means mounted on the other end of said bell-crank lever for cooperation with said cam, spring means biasing said bell-crank lever so that one end engages said stop and said levers move as a unit upon initial movement of said follower by said cam, and stationary stop means for engaging a portion of said bell-crank lever so as to limit its movement as a unit with said supporting lever, said bell-crank lever engaging said stationary stop after said initial movement and thereafter rotating about said pivotal mounting and transmitting to said supporting lever a movement less than the movement imparted to said follower by said cam.

5. In a sensitive relay mechanism, in combination, a member for performing a control function, an operator for engaging said member so as to cause it to perform said control function, means for positioning said operator in accordance with a controlling condition, means for reciprocating said operator between said positioning means and said control member, said reciprocating means comprising a pivoted lever for supporting said operator and cam means for moving said supporting lever, brake means for locking said operator against movement with respect to said lever, motion-reducing mechanism between said cam and said lever comprising a bell-crank lever pivoted on said supporting lever and carrying a follower for engaging said cam, and spring means connecting said bell-crank lever and said brake means so as to bias said brake means into engagement with said operator and to bias said bell-crank lever into engagement with a stop on said supporting lever.

6. In a sensitive relay mechanism, in combination, a member for performing a control function, an operator for engaging said member so as to cause it to perform said control function, means for positioning said operator in accordance with a controlling condition, means for reciprocating said operator between said positioning means and said control member, said reciprocating means comprising, a cam and a follower therefor, said cam being proportioned so that the period of engagement between said operator and said member is a function of the operator position, and a motion reducing linkage between said follower and said operator, said motion reducing linkage being effective to reduce movements of said operator only during that phase of operator reciprocation which includes said period of engagement.

7. In a sensitive relay mechanism, in combination, a member for performing a control function, an operator for engaging said member so as to cause it to perform said control function, means for positioning said operator in accordance with a controlling condition, means for reciprocating said operator between said positioning means and said control member, said reciprocating means comprising a pivoted lever for supporting said operator and cam means for moving said supporting lever, and motion-reducing mechanism between said cam and said lever including a bell-crank lever pivoted on said supporting lever and carrying a follower for engaging said cam.

8. In a sensitive relay mechanism, in combination, a sensitive element movable in accordance with the magnitude of a variable condition, an operator to be positioned in accordance with the position of said sensitive element, said operator comprising a lever having one end adapted for engagement with said element, and means for moving said operator into engagement with said sensitive element without transmitting any appreciable force to said element, said means comprising a driving member pivotally attached to said lever at an intermediate point thereon, and a slip-friction connection between a stationary member and said lever on the opposite side of said intermediate point from said one end.

9. In a sensitive relay mechanism, in combination, a member for performing a control function, an operator for engaging said member so as to cause it to perform said control function, means for positioning said operator in accordance with a controlling condition, means for reciprocating said operator between said positioning means and said control member, said reciprocating means comprising, a cam and a follower therefor, said cam being proportioned so that the period of engagement between said operator and said member is a function of the operator position, a motion reducing linkage between said follower and said operator, and means for varying the extent by which said linkage reduces the motion of the operator in comparison to the motion of the follower.

10. In a sensitive relay mechanism, in combination, a member for performing a control function, an operator for engaging said member so as to cause it to perform said control function, means for positioning said operator in accordance with a controlling condition, means for reciprocating said operator between said positioning means and said control member, said reciprocating means comprising a pivoted lever for supporting said operator and cam means for moving said supporting lever, a bell-crank lever pivotally mounted on said supporting lever, first stop means mounted on said supporting lever for cooperation with one end of said bell-crank lever to limit its rotation about said pivotal mounting, follower means mounted on the other end of said bell-crank lever for cooperation with said cam, spring means biasing said bell-crank lever so that one end engages said stop and said levers move as a unit upon initial movement of said follower by said cam, stationary stop means for engaging a portion of said bell-crank lever so as to limit its movement as a unit with said supporting lever, said bell-crank lever engaging said stationary stop after said initial movement and thereafter rotating about said pivotal mounting and transmitting to said supporting lever a movement less than the movement imparted to said follower by said cam, and means for adjusting said stationary stop means so as to vary the ratio between the movement of the follower and the movement of the supporting lever.

11. In a sensitive relay mechanism, in combination, a member for performing a control function, an operator for engaging said member so as to cause it to perform said control function, means for positioning said operator in accordance with a controlling condition, means for reciprocating said operator between said positioning means and said control member, said reciprocating means comprising a cam and a follower therefor, said cam being proportioned so that the period of engagement between said operator and said member is a function of the operator position, brake means biased to engage said operator, and means operating concurrently with said cam for releasing said brake means when said operator engages said positioning means.

12. In a sensitive relay mechanism, in combination, a member for performing a control function, an operator for engaging said member so as to cause it to perform said control function, means for positioning said operator in accordance with a controlling condition, means for reciprocating said operator between said positioning means and said control member, said reciprocating means comprising, a cam and a follower therefor, said cam being proportioned so that the period of engagement between said operator and said member is a function of the operator position, a motion reducing linkage between said follower and said operator, and means for determining the phase of operator reciprocation during which said motion reducing linkage is effective to reduce the movements of said operator.

13. In a sensitive relay mechanism, in combination, a member for performing a control function, an operator for engaging said member so as to cause it to perform said control function, means for positioning said operator in accordance with a controlling condition, means for reciprocating said operator between said positioning means and said control member, said reciprocating means comprising, a cam and a follower therefor, said cam being proportioned so that the period of engagement between said operator and said member is a function of the operator position, and stop means independent of said cam for determining the limit of movement of said operator toward said positioning means.

14. In a sensitive relay mechanism, in combination, an element for performing a control function, an operator member for engaging said element so as to cause it to perform said control function, means for positioning said operator member in accordance with a controlling condition, means for reciprocating said operator member between said positioning means and said control element so that the period of engagement between said operator member and said control element is a function of the position of said operator member, said reciprocating means including a lever and a pivotal connection for supporting said operator member on said lever, a stationary member for supporting said lever, braking means for preventing movement of said operator member with respect to said lever, one of said members having a substantially cylindrical surface portion, and an elongated spring mounted at one end on the other of said members and positioned to engage said surface portion, said surface portion and spring cooperating when said braking means is released so that said surface portion rolls on said spring when said lever is moved relative to said stationary member, thereby causing rotation of said operator member with respect to said lever, said spring sliding over said surface portion when said braking means is applied to permit relative movement of said lever and said stationary member while said operator member remains fixed with respect to said lever.

15. In a sensitive relay mechanism, in combination, an element for performing a control function, an operator member for engaging said element so as to cause it to perform said control function, means for positioning said operator member in accordance with a controlling condition, means for reciprocating said operator member between said positioning means and said control element so that the period of engagement between said operator member and said control element is a function of the position of said operator member, said reciprocating means including a lever and a pivotal connection for supporting said operator member on said lever, a stationery member for supporting said lever, one of said members having a substantially cylindrical surface portion, and an elongated spring mounted on the other of said members and positioned to engage said surface portion, said surface portion and spring cooperating so that said surface portion rolls on said spring when said lever is moved relative to said stationary member, thereby causing rotation of said operator member with respect to said lever.

WILLIS H. GILLE.
JOHN V. SIGFORD.
LESLIE H. MILLER.